United States Patent

[11] 3,621,144

[72] Inventors Nikola L. Jovic
Chicago;
Timothy J. Keough, Woodridge, both of Ill.
[21] Appl. No. 36,890
[22] Filed May 13, 1970
[45] Patented Nov. 16, 1971
[73] Assignee International Telephone and Telegraph Corporation
New York, N.Y.

[54] CALL-ORIGINATING CONTROL FOR ELECTRONIC TELEPHONE SYSTEMS
8 Claims, 5 Drawing Figs.

[52] U.S. Cl. .......... 179/18 FG
[51] Int. Cl. .......... H04q 3/18
[50] Field of Search .......... 179/18 FG

[56] References Cited
UNITED STATES PATENTS
3,170,992 2/1965 Kinsey .......... 179/18 FG

*Primary Examiner*—William C. Cooper
*Attorneys*—C. Cornell Remsen, Jr., Walter J. Baum, Paul W. Hemminger, Charles L. Johnson, Jr., James B. Raden, Delbert P. Warner and Marvin M. Chaban

ABSTRACT: The system shown covers the portion of an electronic, end-marking switching network which responds to the condition of subscriber requesting service (off-hook condition) by connecting his line to an available link circuit. The request for service is coordinated with the marking of the output end of the matrix (link circuit end) to thereafter mark the input end of the matrix to implement the connection through the "self-seeking," end-marked matrix.

INVENTORS
NIKOLA L. JOVIC
TIMOTHY J. KEOUGH
BY Marvin Chaban
ATTORNEY

CALL-ORIGINATING CONTROL FOR ELECTRONIC TELEPHONE SYSTEMS

BACKGROUND OF THE INVENTION

The invention relates to the electronic equipment used for the extension of a call from a calling party to an available link circuit for connection to a register circuit.

The circuit shown is an improvement over the like portions of U.S. Pat. No. 3,258,539, issued on June 28, 1966, to N. V. Mansuetto et. al. for Electronic Telephone Switching System, the Mansuetto et al. patent being an improvement over a series of patents, many of which are listed in the Mansuetto Pat.

In such a system, an allotter provides timed gated periods for each available link circuit which are pulsed accordingly. The pulses pass through a call enabling circuit (FIG. 4 of Mansuetto) to end mark one side of the "self-seeking" switching matrix. A calling line circuit marks the other side of the matrix through the enabling circuit, which coordinates the call origination through its own logic circuiting.

SUMMARY OF THE INVENTION

It is therefore an object of the invention to provide an improved call-originating system for an electronic telephone switching network.

It is further an object of the invention to provide in a telephone switching network, a periodic gating allotter whose output is blocked from reaching subscriber lines except when a call is awaiting connection to the call-originating circuit.

It is a further object of the invention to provide an electronic telephone system which responds to an excessive number of calls awaiting service by disabling call-originating circuits and allied circuits which might be damaged by the current imposed by the excessive demand.

Other objects, features, and advantages will become apparent from the description which follows.

DETAILED DESCRIPTION

Figure 1:
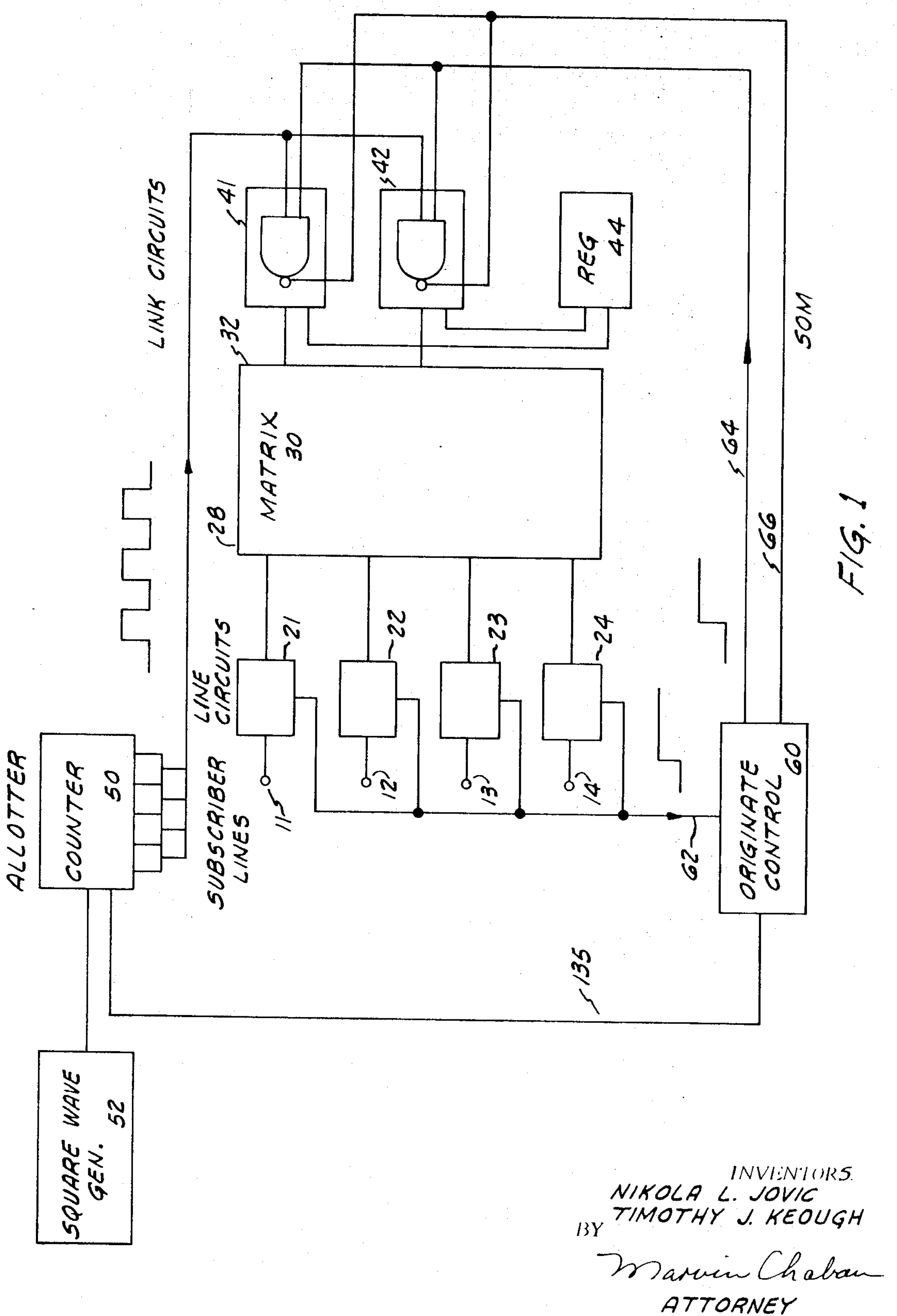
FIG. 1 is a block diagram of a telephone system using the invention.

Turning now to the drawings, in FIG. 1 we show a block diagram of a portion of a telephone exchange.

In this exchange there are shown a plurality of telephone stations of which only four are shown, numbered 11–14, each being connected to its respective line circuit 21–24. Each of the line circuits is connected to terminals on the primary side 28 of the matrix 30. Matrix 30 in one form is shown in detail in U.S. Pat. No. 3,204,044, entitled, "Electronic Switching Telephone System," issued on Aug. 31, 1965 to Virgle E. Porter, and assigned to the assignee of this invention.

The terminations on the output side of 32 of matrix 30 are connected to respective link circuits of which two are shown, numbered 41 and 42. In one exemplary form, there may be employed 12 link circuits per 100 lines within the exchange. Each link circuit is used to extend or further a call through a register circuit 44 within the exchange to complete a call to another subscriber in the exchange, or to forward calls to trunks connected to other exchanges. Such link circuits and their call forwarding function are well known in the art from the patents cited herein.

Connected to each link circuit is an allotter 50 common to the system and which is fed a square wave of output at 600 Hz. received from a square wave generator 52 of any conventional type, such as described in the cited patents. The allotter 50 acts as a gating counter to successively enable each idle link circuit in sequence for successive timed periods. A time period of 1.6 milliseconds may be used herein as the timed gating period during which each link circuit is enabled for marking and for possible accessing through the network matrix.

Further in the block diagram of FIG. 1 there is shown an originate control circuit 60. This circuit is shown in detail in FIGS. 2*a*, 2*b*, and 2*c*, and through the interaction with the other described circuit components forms the substance of the present invention.

In general the operation of the circuit of FIG. 1 may be described as follows:

In the normal state, the timing allotter 50 is being driven at 600 Hz. and provides individual mark pulses during successive time slots to each link circuit 41, 42 and to register circuit 44. These pulses permit each idle link circuit to mark the output side of the matrix during the marked period. Coincidentally, these marking pulses are also fed to the call-originating circuit 60.

A request for service by an off-hook telephone subscriber station, such as 11, passes through line circuit 21 and is detected by the originate control circuit 60 over lead 62 without identifying the specific calling telephone subscriber station. Circuit 60 extends this request over lead 64 as a gating pulse to idle link circuits 41 and 42. As mentioned previously, idle link circuits 41 and 42 sequentially mark the output 32 side of the matrix 30 with a negative voltage during their respective allotted time period.

Coincident with each gating pulse, the originate control circuit 60 receives a response signal from the marked, idle link circuit on lead 66. As response to this signal, the subscriber line circuit (such as 21) requesting service will be allowed to mark the primary side 28 of the matrix 30 with a positive firing voltage. The matrix with both ends marked will attempt to complete a path between the marked ends, as described in the cited prior art.

After the firing of a completed path through the matrix to the link circuit (only one matrix path will be held), an idle register 44 is connected to the seized link circuit. The random access of an idle register may be accomplished through a separate, single-stage link circuit register matrix (not shown), in any manner known to the prior art.

Once a path is completed through the matrix from the line circuit to idle link circuit, the line circuit disables its connection to lead 62, releasing the originate control circuit 60.

The register 44 once accessed is seized and continues the extension of the call. Further circuits beyond the purview of this invention control such steps.

Figures 2, 2A:
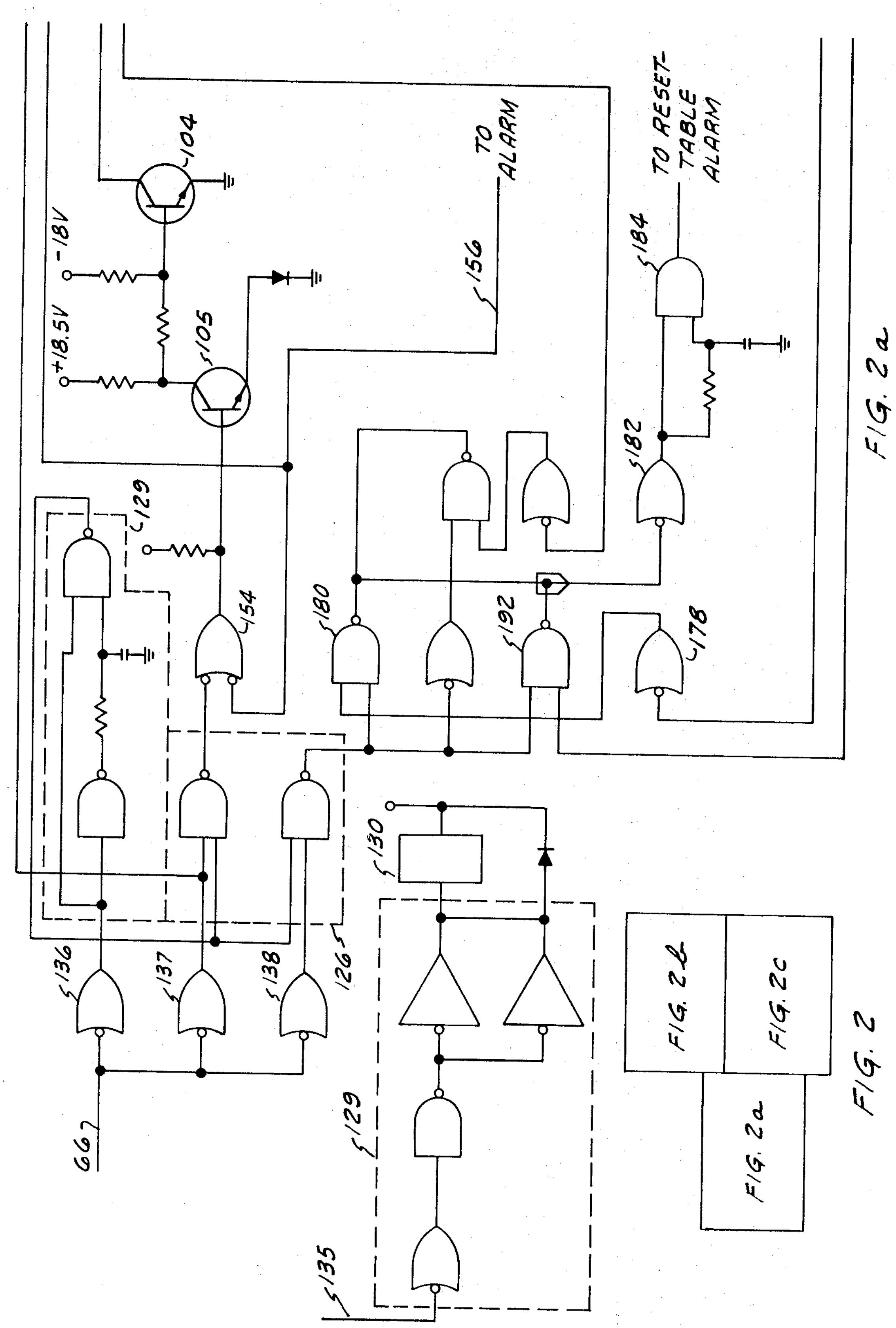
FIG. 2 is a block diagram showing how to join the drawings of FIGS. 2*a*, 2*b*, and 2*c* to form a complete circuit.
FIGS. 2*a*, 2*b*, and 2*c* in combination comprise a schematic circuit drawing in detail of the call originating circuit of FIG. 1.
Figure 2B:
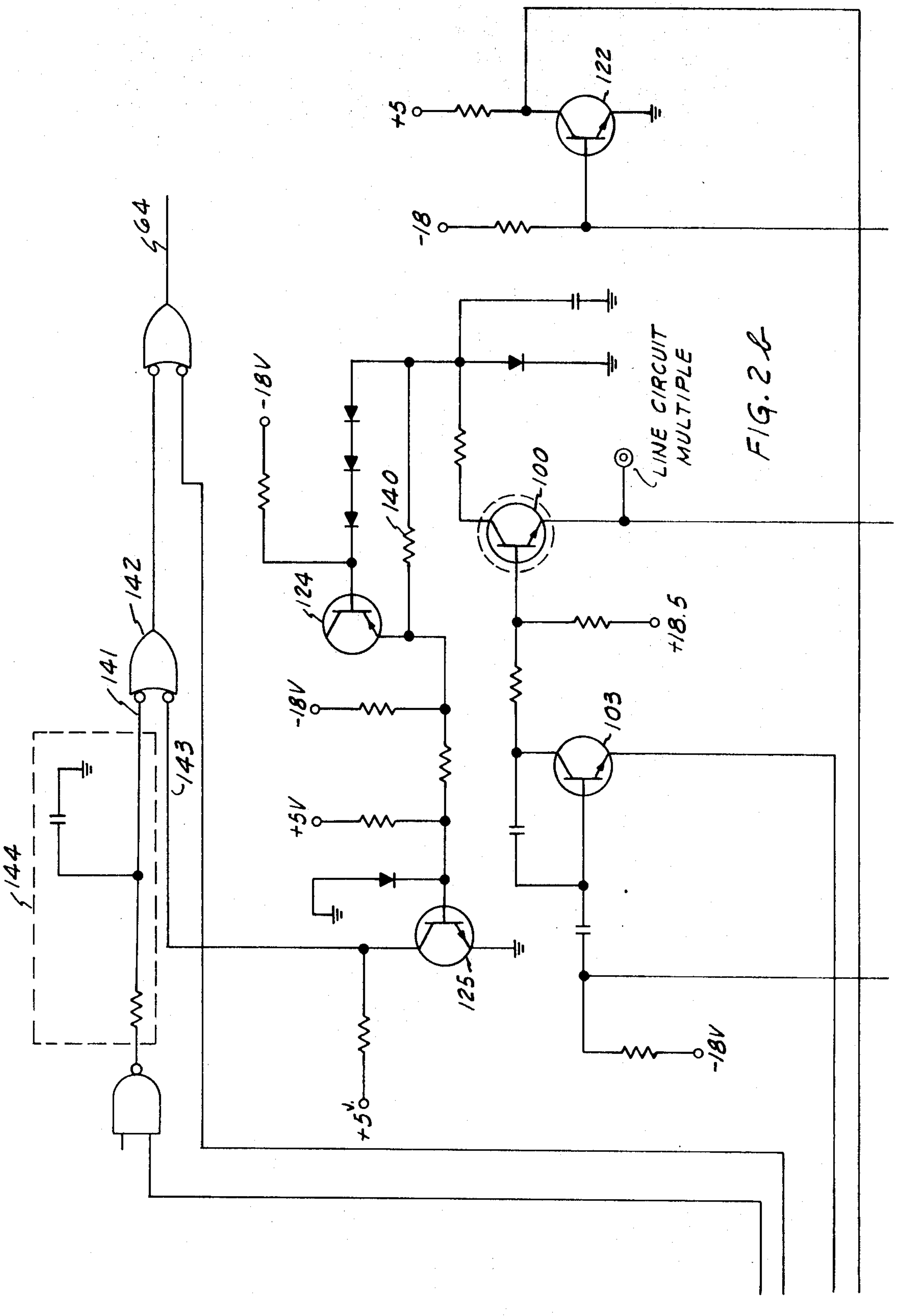
Figure 2C:
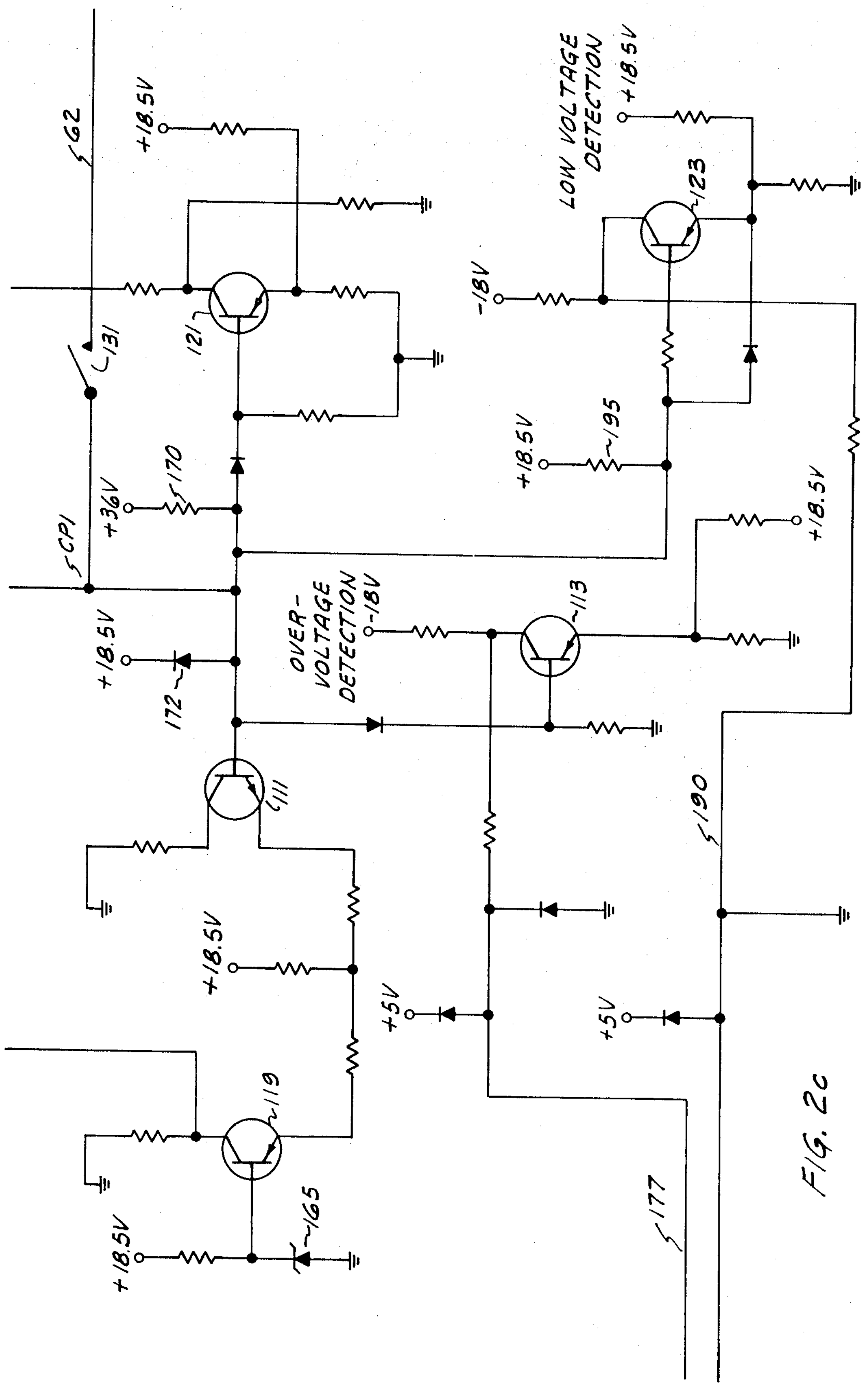

Within the circuit of FIGS. 2*a*, 2*b*, and 2*c*, there are provided a plurality of transistors which are used as the basic switching elements. These transistors are identified by reference numeral and by function in the table below, which lists their normal state with the system in its inoperative condition.

TABLE I

| | Function | Normal State |
|---|---|---|
| Transistor | | |
| 100 | Off-Hook Sensing | Active Region |
| 103 | Idle Link Sensing | Active Region |
| 104 | Idle Link Sensing | On |
| 105 | Idle Link Sensing | Off |
| 111 | Differential Amplifier for Voltage Regulation | Active Region |
| 113 | Excess Demand Sensing | On |
| 119 | Differential Amplifier for Voltage Regulation | Active Region |
| 121 | Operating Voltage Detector | On |
| 122 | Operating Voltage Detector | On |
| 123 | low-voltage Sensing | Off |
| 124 | Link Circuit Enabler | On |
| 125 | Link Circuit Enabler | Off |

In addition to the transistors, their supporting components such as resistors, capacitors, and diodes are shown in the drawings but will only be referred to and numbered when necessary to the explanation. The resistors within the circuits of these transistors are primarily for the purposes of limiting the current to the transistor, acting as the current load or biasing the transistor base.

Further, there are provided a plurality of gates generically referred as AND gates or OR gates regardless of whether they invert and technically are NAND or NOR circuits. The AND gates and OR gates shown collectively reference numeral 126 within the area of the circuit dependent on lead 66 for pulses from the link circuits. These gates together with an RC delay circuit 128 combine to produce a very short delay on pulses on lead 66 as will be explained. A further group of gates with amplifiers are positioned within a holding circuit 129 for electromechanical relay 130. This relay has one set of contacts 131 connecting leads 62 to the collector of transistor 100. Circuit 129 detects whenever an allotter 50 is properly connected to the exchange and fully functioning. As long as an allotter is operatively associated with control circuit 60, ground will appear on the allotter end of conductor 135 to maintain relay 130 operated. Relay 130 thereby maintains its contacts 131 closed to allow transistor 100 to sense the conditions at the subscriber stations connected in multiple to lead 62.

During normal operation of the system, allotter 50 is connected to originate control circuit 60 to maintain relay 130 operated. Further, the allotter sends its timed pulses to the successive idle link circuits to pulse these link circuits in sequence. On being pulsed, these idle link circuits respectively mark the output end of the matrix in sequence. Coincident with this marking, a signal is sent on lead 66 to the originate control circuit. This signal is transmitted in multiple to the single-input inverter OR-gates 136, 137, and 138. The output of gate 137 is channelled to one input 141 of OR-gate 142. The output of OR-gate 142 feeds lead 64 to enable the link circuits in their pulsing whenever either of its inputs leads 141 or 143 is enabled. Lead 141 receives a signal delay slightly by RC network 144 enabling the OR gate whenever a link circuit pulsing signal is received on lead 66. Lead 143 is connected to the collector of transistor 125 so that on conduction of transistor 125, a ground signal is sent on lead 143 when transistor 125 is off, +5 volts is sent on lead 143 through resistor 146.

With the transistors of the originate control 60 in the condition shown in table 1, a subscriber station seeking service in a known manner closes a circuit through its respective line circuit to lead 62. The line circuit closure causes current to flow through transistor 100 which is normally biased in its active region. On receipt of the current indicative of a closed circuit condition, transistor 100 is clamped inoperative to produce a voltage level of approximately 5.6 volts DC across the line circuit. The consequent voltage drop across resistor 140 produces a reverse bias on the collector of transistor 124, causing transistor 124 to shut off. When transistor 124 shuts off, transistor 125 is rendered conductive, placing ground potential on lead 143 leading to gate 142.

With lead 143 of gate 142 at ground potential, a signal is transmitted from the gate circuit on lead 64 to enable the link circuits to return pulses on lead 66 under the control of pulses from the allotter. As mentioned previously, when an idle link circuit receives the ground pulse from lead 64 and this ground signal coincides with the timing pulse received from the allotter, a signal is sent back to the originate circuit on lead 67. This signal is transmitted through the multiple gate circuit 150 and thereafter the RC delay circuit 128 which imposes a 50-microsecond delay on the signal. The delay allows the link circuit to mark its end of the matrix path prior to the passage of the signal toward the line circuit. The signal delayed slightly behind the original pulsed signal is transmitted to the base of the transistor 105 which causes this transistor to conduct. Conduction of transistor 105 causes transistors 103 and 104 to cease conduction. The net effect of this action causes transistor 100 to conduct fully and place +18 volts DC on conductor 62 and the line circuit multiple to mark the primary end of matrix 30 for the line circuit seeking service.

During the period of coincidence of a pulse on lead 66 marking an idle link circuit, and +18 volts on lead 62, both ends of the matrix are marked for the mutual search path.

If the path is not completed by the end of the timed idle link circuit pulse on lead 66, a signal will be transmitted on that lead to shut off transistor 105. Transistor 103 will restore to conduction and will thereby remove the +18-volt marking signal from the line circuit end of the matrix. When the next idle link circuit pulse is fed through lead 66, transistors 103, 104, and 105 will recycle, and the marking will reappear at the line circuit for searching a path between the marked ends.

When a complete path has fired through the matrix, the connection to the link circuit reverses the voltage to the line circuits to a value of −18 volts. A sensing diode in the line circuit (not shown as well known in the art), will sense the current reversal and will in effect disconnect the connected line circuit from the originate control circuit lead 62. It can be seen that so long as no line circuit is closed and seeking service, transistor 100 remains in its active region and blocks the transmission of pulses from lead 66 and any consequent pulsing of transistor 103 from having any effect on lead 62 and the subscribers lines. Without this isolation of the pulses from the lead to subscriber line circuits, noise resulting from these pulses could appear on subscriber lines. Transistor 100 sensing the current resulting from a subscriber seeking service to couple the pulsing circuit to the subscribers line only on coincidence of the pulsing signal and the service-seeking signal. At that time only, do any pulses resulting from the link circuit allot pulses appear on lead 62 to the subscriber stations.

One major feature of the invention comprises an excess usage control which performs in a fail-safe manner. This control operates in the following manner:

If an excessive number of subscribers is seeking service at the same time, the current requirements received by the originate circuit on lead 62 will cause the voltage at point CP1 to exceed 6 volts and reach toward 8 volts. This regulated 5.6 volts through zener diode 165 will unbalance the differential amplifier of transistors 111 and 119, so that the voltage increase transmitted to the base of transistor 113 will cause this transistor to switch off. Shutting off this transistor will place +18 volts through transfer point CP1 over resistor 170 from the +36.5 volt source in a path through diode 172 to +18.5 source. Further an alarm is initiated over lead 177 through gates 178, 180, 182, and 184 on lead 185 to an alarm system which may include an alarm signal which may be visual or audible to respond. In this way a permanent +18-volt signal is impressed on lead 62 to all line circuits, and all line circuits seeking service will receive this +18-volt marking signal. By this control, a heavy use condition which could cause a shutdown of the system activates a fault sensor which controls by providing service to all by disenabling the possible blockage of the necessary marking voltage.

Similarly, if during periods in which an allotted pulse signal is absent from lead 66, an excessively low voltage is transmitted on lead 62, a problem will exist. This low voltage condition will be indicated at point CP1 and lower the voltage to the base of transistor 123. Transistor 123 will conduct, feeding a signal over lead 190 to AND-circuit 192, which in turn is transmitted to gate circuits 182 and 184 and the alarm lead. Conduction of transistor 123 will allow the +18.5 volts through resistor 195 to feed the function point CP1 and maintain that voltage level at the junction point until the system is reset.

While there has been described what is at present thought to be the preferred embodiment of the invention, it is understood that modification changes may be made therein, and it is intended to cover in the appended claims, all such modifications which may be made within the true spirit and scope of the invention.

What we claim is:

1. An electronic telephone switching system comprising a current-controlled, self-seeking switching network, a plurality of telephone subscriber line circuits connected to one side of the network and a plurality of connection forwarding link circuits connected to the other side of the network, means responsive to one of subscriber line circuits seeking connection to said network for initiating a first signal, means responsive to an idle link circuit for conditioning said link circuit to mark said other side of said network, and means responsive to the coincidence of said first and second signals for conditioning said one subscriber line to mark the one side of said network to enable said self-seeking network to join a path between said marked circuits.

2. A system as claimed in claim 1, wherein there is an allotter sequentially enabling idle link circuits for successive timed periods, said coincidence means comprises gates transmissive of said second signal and switching means responsive to said second signal.

3. A system as claimed in claim 2, wherein said switching means comprises a plurality of transistors.

4. An electronic telephone system comprising a current-controlled switching matrix which in response to a line circuit marking at one end of the matrix and a call-forwarding link circuit marking at the other end seeks to complete a path between the marked ends, the invention comprising a counting chain for pulsing and enabling idle link circuits in sequential order to enable said link circuits to successively mark the other end of said matrix, means responsive to said link circuit enabling for transmitting a signal derived from said successive marking toward said line circuits, means responsive to a line circuit seeking a path through said matrix for providing a signal, and means responsive to the coincidence of said last-mentioned signal and said derived signal for producing a line circuit marking signal to said matrix.

5. A system as claimed in claim 4, further comprising delay means in said transmitting means for delaying the derived signal prior to said coincidence.

6. A system as claimed in claim 5, wherein said transmitting means comprises a switching network for sensing a line circuit seeking path for emitting a marking signal on a multiple to a plurality of line circuits.

7. An electronic telephone switching system comprising a current-controlled, self-seeking switching network, a plurality of telephone subscriber line circuits connected to one side of the network and a plurality of connection-controlling link circuits connected to the other side of the network, means responsive to one of subscriber line circuits seeking connection to said network for completing a circuit to initiate a first signal, the invention comprising means responsive to the coincidence of said first signal and a signal from link circuits, for conditioning said one subscriber line to mark the one side of said network to enable said self-seeking network to initiate a path therethrough, means for sensing the current drain of said completed circuit, said sensing means responsive to the drain resulting from more than a predetermined number of subscriber line circuits seeking connection of said network for automatically marking the one side of said network.

8. A system as claimed in claim 7, wherein said coincidence means comprises switching means disabled by said drain for producing said automatic marking.

* * * * *